(12) United States Patent
Birrell et al.

(10) Patent No.: US 7,273,345 B2
(45) Date of Patent: Sep. 25, 2007

(54) METHOD FOR OPERATING A TURBO ENGINE AND TURBO ENGINE

(75) Inventors: Andrew Birrell, Rieden (CH); Armin Busekrose, Zurich (CH); Olatunde Omisore, Nussbaumen (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 11/417,186

(22) Filed: May 4, 2006

(65) Prior Publication Data

US 2007/0065274 A1   Mar. 22, 2007

Related U.S. Application Data

(63) Continuation of application No. PCT/EP2004/052784, filed on Nov. 3, 2004.

(30) Foreign Application Priority Data

Nov. 7, 2003   (DE)   ................. 103 52 089

(51) Int. Cl.
 *F01D 25/12*   (2006.01)
(52) U.S. Cl. .................. 415/1; 415/144; 415/116; 415/108
(58) Field of Classification Search ............. 415/1, 415/115, 116, 144, 108
 See application file for complete search history.

(56) References Cited

U.S. PATENT DOCUMENTS

| 1,734,216 | A | * | 11/1929 | Lamb ........................ 415/1 |
| 2,402,841 | A | | 6/1946 | Ray |
| 3,029,064 | A | * | 4/1962 | Buckingham ............... 415/47 |
| 5,167,487 | A | * | 12/1992 | Rock ........................ 415/173.3 |
| 5,980,201 | A | * | 11/1999 | Benoist et al. ............ 415/115 |
| 2001/0022933 | A1 | | 9/2001 | Bangert et al. |

FOREIGN PATENT DOCUMENTS

| DE | 102 33 113 A1 | 5/2003 |
| EP | 0 503 752 A1 | 9/1992 |
| WO | WO 03/038242 A1 | 5/2003 |
| WO | WO 2004/090291 A1 | 10/2004 |

\* cited by examiner

*Primary Examiner*—Ninh H. Nguyen
(74) *Attorney, Agent, or Firm*—Buchanan Ingersoll & Rooney PC

(57) ABSTRACT

Means for driving a flow are arranged in cavities which are formed, in particular, in multishell casings of turbo engines. In one embodiment, within the cavity, ejectors are arranged which are supplied via suitable means with a propellant flow which, in turn, activates the flow, for preference a circumferential flow. Preferably, during the operation of the turbo engine a propelling fluid which is colder than the fluid content of the cavity is injected via the ejectors. In this way, at the same time, the cavity is cooled and an equalization of the temperature of the fluid content of the cavity is brought about.

12 Claims, 5 Drawing Sheets

METHOD FOR OPERATING A TURBO ENGINE AND TURBO ENGINE

TECHNICAL FIELD

The present invention relates to a method for operating a turbo engine and to a turbo engine particularly suitable for carrying it out.

PRIOR ART

Modern gas turbines are often designed with two-shell casings in the part subjected to high thermal load. In this case, an annular space is formed between an inner casing and an outer casing. Gas within this annular space heats up very sharply during operation. Furthermore, there are potentials for the formation of undesirable vertical temperature stratifications on account of the free convection in the annular space, this being accompanied by the introduction of thermal stresses into structures subjected to both thermal and mechanical load.

Comparable geometries are also known from other turbo engines such as, for example steam turbines, where phenomena comparable in tendency occur, even though these generally take place at a lower temperature level.

PRESENTATION OF THE INVENTION

The object of the invention is to provide a remedy at this point. The object of the invention, therefore, is, in particular, to specify a possibility for cooling the cavity and to prevent temperature stratifications potentially occurring during the operation of the turbo engine.

The core of the invention is, during the operation of the turbo engine, to activate a flow oriented with at least one velocity component in a circumferential direction of the turbo engine or of a toroidal cavity. In a preferred embodiment, a propellant flow with a circumferential component is injected into the cavity via at least one ejector, and a forced tangential convection flow is thereby activated in the cavity and is directed at least partially opposite to the free convention movement and brings about an equalization of the temperature in the cavity. Preferably cooling air or ambient air is injected as propellant. These measures give rise at the same time to an equalization of the temperatures and to a cooling of the cavity. According to one embodiment of the invention, air is in this case conveyed by a suitable conveying means, for example a blower or a compressor, to the ejector or ejectors. According to a second embodiment, an air stream in the compressor of a gas turbo group is extracted and is lead as propellant to the at least one ejector. According to a further embodiment, air is extracted from a cooling air system of a gas turbo group and is used as propelling medium for the at least one ejector.

A turbo engine which is fundamentally suitable for carrying out the method according to the invention became known from WO 03/038243. However, the problem of cooling the cavities during the operation of the turbo engine and the remedy, surprisingly simple per se, of the injection of coolant as a propellant of the ejector, which at the same time brings about an equalization of the temperatures, was not recognized there.

The cavity is formed, in particular, between an inner and an outer casing of the turbo engine, thus, for example, between a combustion space wall and an outer casing of a gas turbine. In this case, the cavity has an essentially annular cross section (torus) or a cross section shaped like a portion of a torus, in the form of a ring segment. The flow is in this case activated preferably by one or more ejectors which are arranged within the cavity and can be operated by means of a propelling fluid, such as for example air. Ejectors require only a low propelling fluid mass flow in order to drive, within the cavity, a flow which is sufficient for the intended purpose. This limitation of the mass flow of the propelling medium is important precisely when existing auxiliary systems, which convey cold fluid, for example outside air, into the cavity, are to be used for driving the flow. A mass flow of the propelling medium led through the ejector is preferably between 0.2 and 1.0 kg/s. The propelling fluid used may also be, alternatively, the air from the gas turbine compressor or from another compressor, or air may be branched off from a cooling air system of a gas turbo group. Where steam turbines are concerned, steam of a suitable pressure and of a suitable temperature is preferably used as propelling fluid.

If the cavity has an annular cross section and the ejectors are oriented with their blow-out direction essentially in the circumferential direction, it is preferable to generate a circumferential flow or helical flow with a pitch angle of less than 30°, preferably less than 10°, since, in the case of an axially extensive cavity, an equalization of the axial temperature distribution can also be achieved in this way.

It is advantageous, furthermore, in terms of the intensity of flow activation, if a number of two or more ejectors with a codirection orientation of the blow-out direction are preferably arranged equidistantly on the circumference of the cavity. A turbo engine for implementing the invention comprises a propelling fluid plenum which is supplied with propelling fluid via a common supply line and from which at least one ejector, preferably a plurality of ejectors, and, most particularly advantageously, all the ejectors branch off. Only one central infeed for the propelling fluid is thereby necessary, while the propelling fluid plenum brings about uniform distribution to the various ejectors issuing into the cavity.

For the further improvement in the cooling of the turbo engine, there is provision, according to a further embodiment of the invention, for continuously maintaining the circulation flow during the operation of the turbo engine and for changing over to cyclic operation after operation, that is to say after the turbo engine has been put out of operation. In this case, the circulation flow is generated at intervals. For example, in operation at internals, the flow may be maintained for a time of 1 to 20 minutes, preferably of about 5 minutes, whereupon an intermission of about 15 to 60, preferably 30, minutes follows. This process is then repeated several times until sufficient cooling of the turbo engine is achieved. The intervals and the spacings between the intervals may, of course, be varied according to the requirements. In particular, the intervals do not have to be identical in their length and in their time spacings. Furthermore, the cooling rates (cooling intensity per unit time) may also be different in the individual intervals. For example, higher cooling rates at the commencement of cooling and lower cooling rates thereafter can be selected.

BRIEF DESCRIPTION OF THE DRAWINGS

The invention will be explained in more detail below with reference to the drawings in which, in particular.

The following figures, of course, represent merely illustrative examples and are not capable, by far, of representing all those embodiments of the invention, such as is characterized in the claims, which become apparent to those skilled in the art.

WAY OF IMPLEMENTING THE INVENTION

Figure 1:
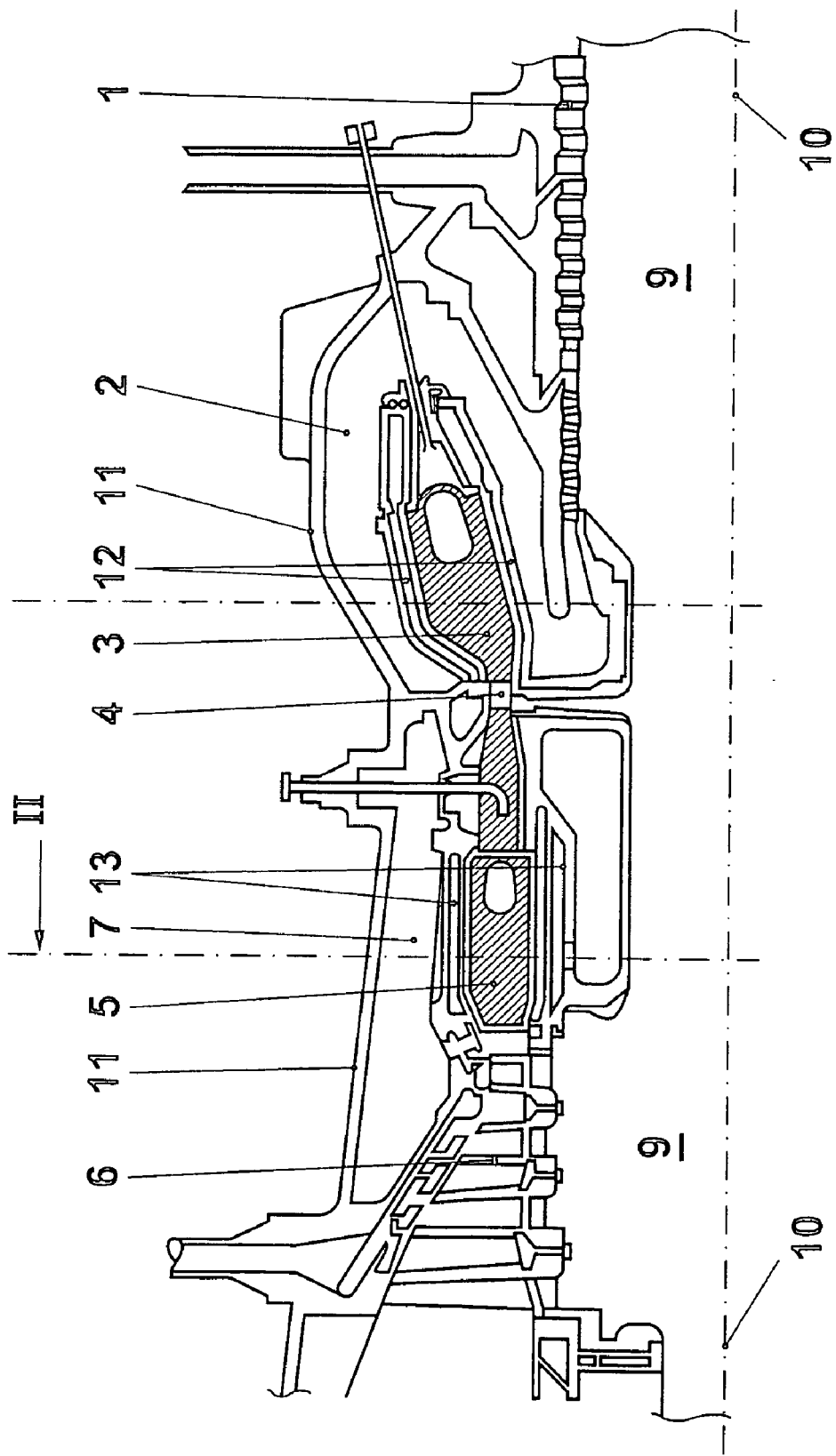
FIG. 1 shows part of the thermal block of a gas turbine.

The invention is explained by the example of a gas turbine. FIG. 1 illustrates the thermal block of a gas turbine, only the part located above the engine axis 10 being shown. The engine illustrated in FIG. 1 is a gas turbine with what is known as sequential combustion, such as is known, for example, from EP 620362. Although its type of functioning is not of primary importance to the invention, this will be explained in rough outline for the sake of completeness. A compressor 1 sucks in a mass air flow and compresses this to a working pressure. The compressed air flows through a plenum 2 to a first combustion chamber 3. A fuel quantity is introduced there and is burnt in the air. The hot gas occurring is partially expanded in a first turbine 4 and flows into a second combustion chamber 5, what is known as a SEV combustion chamber. Fuel supplied there is ignited on account of the still high temperature of the partially expanded hot gas. The reheated hot gas is further expanded in a second turbine 6, mechanical power being transmitted to the shaft 9. During operation, temperatures of several 100° C. prevail even in the last compressor stages, but certainly in the region of the combustion chambers 3, 5 and in the turbines 4, 6. In the region of the second combustion chamber 5, the casing of the turbo engine is of multishell design. An annular cavity is formed between an outer casing 11 and an inner casing 13. By the introduction of heat via the inner casing wall and the penetration of consumed cooling air or hot gas, temperatures of up to 550° C. and even above this may readily arise in the cavity. On the other hand, the cavity has, if at all, only a slight vertical forced throughflow, this being conducive in the formation of pronounced vertical temperature stratifications which may ultimately lead to a distortion of the casing.

Figure 2:
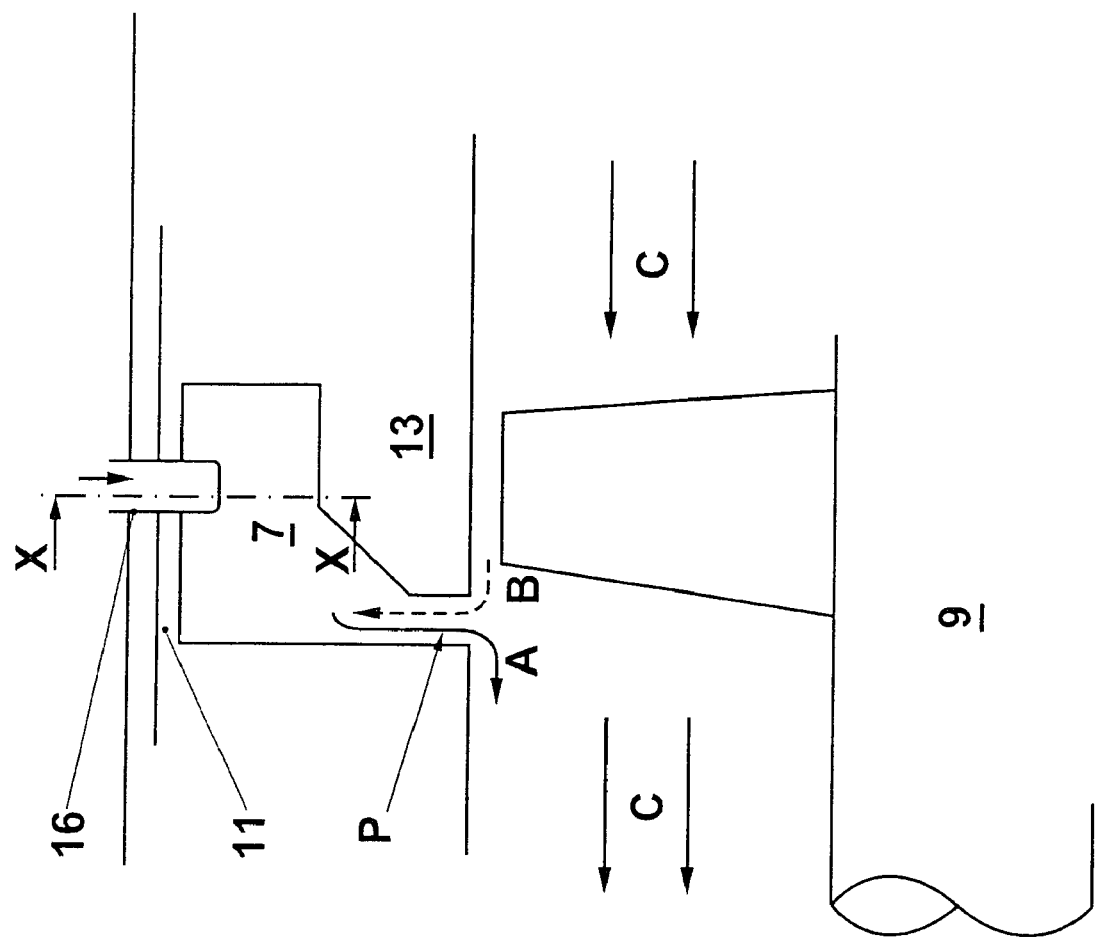
FIG. 2 shows a diagrammatic view of part of the gas turbine in order to explain the principle according to the invention.

FIG. 2, then, illustrates the principle according to the invention. During the operation of the turbine, a flow oriented in the circumferential direction is activated in the cavity 7. For this purpose, a fluid (for example outside air) is introduced into the cavity via one or more ejectors 16. The temperature of the hot gas inside the cavity 7 between the outer casing 11 and the inner casing 13 typically lies, without cooling, at approximately 550° C. or above. In this case, for example, hot gas, which flows through the turbo engine at a temperature of 600° C. or more in the direction of the arrow C, penetrates into the cavity 7 via the orifice P, as is indicated by the arrow B. By means of the ejector 16, cooler medium, for example ambient air conveyed via a blower, or else bleed air from the compressor 1, sees FIG. 1 in this respect, or cooling air from a cooling air system, is introduced into the cavity. The mass flow of the cooling fluid in this case lies typically in the range of around 0.2 kg/s to 1 kg/s. This proves sufficient to lower the temperature in the cavity to, for example, 400° C. A mass equivalent to the mass flow flowing into the cavity 7 flows out as compensating flow A into the hot gas flow C. It is also possible to carry out the method according to the invention in the system in which the coolant runs through a closed circuit via a compressor or a blower. For this purpose, the internal pressure in the cavity should not be too high, since the compressor or the blower has to be sealed off relative to the pressure level occurring in the cavity. In a preferred embodiment of the invention, the ejector is operated intermittently after the turbine has been shut down. A controlled cooling of the engine is thereby achieved. Said measure avoids the situation where the inner casing cools too sharply or too quickly and the play between rotor and casing, associated with sharp cooling after shutdown, becomes too low. Preferably, the cavity is acted upon by the cooling air inflow in a plurality of cooling phases of a duration of about five minutes. The time between two successive cooling phases is preferably 30 minutes. As a result of this cyclic aftercooling, a particularly careful cooling of the turbine takes place, so that undesirable effects occurring due to natural convection, such as the feared "denting" of the casing, are avoided.

Figure 3:
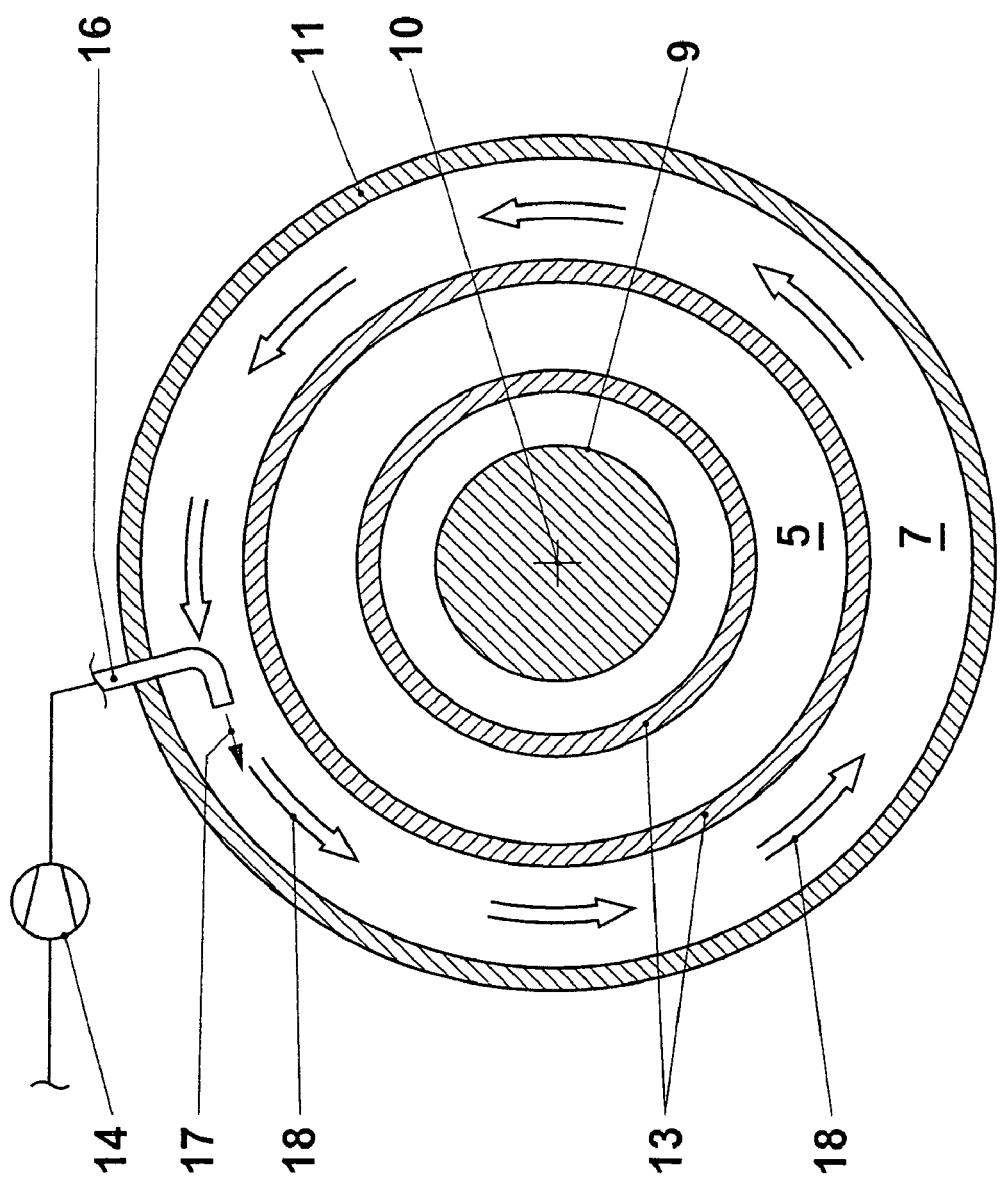
FIG. 3 shows a sectional view of a gas turbine shown in FIG. 1.

FIG. 3 shows, to illustrate the method according to the invention further, a highly diagrammatic cross section through the gas turbine of FIG. 1 along the line II-II. The annular cavity 7 is formed between an outer casing 11 of the gas turbine and a combustion space wall 13 which may also be understood as an inner casing. The ejector 16 injects ambient air, which is delivered by a blower 14 and is markedly cooler than the fluid content of the cavity 7, into the annular cavity with a tangential component as a propellant flow 17. The propellant flow there drives a circumferential flow 18 which affords compensation of the vertical temperature stratification occurring due to natural convection. In the embodiment illustrated, the ejector is arranged at a geodetically high point of the cavity, thus resulting in further assistance of the driving action on account of the density difference between the comparatively cooler propellant flow 17 and the fluid content of the cavity 7. In the way illustrated, the fluid content of the cavity is cooled, and, at the same time, the formation of the potentially harmful stable temperature stratification is avoided. Preferably, a nonreturn element is arranged between the blower 14 and ejector 16, in such a way that the potential backflow of hot gas is prevented and a thermal loading of the blower 14 is avoided. A further advantage is that auxiliary systems present, if appropriate, for example a compressed air system present in any case, can easily be adapted to convey the propelling medium, in such a way that, under certain circumstances, the blower 14 may be dispensed with completely. To avoid thermal shocks, the propellant conveyed to the ejector may be conducted, as a preliminary, to the supply line to the ejector 16 via heat exchanger surfaces, for example through or via hot structures of the engine itself. A preheating of the propelling fluid is in any case ensured when the turbo engine is in operation, if the propellant is extracted from an intermediate compressor lead or from the cooling air system of a gas turbo group.

Figure 4:
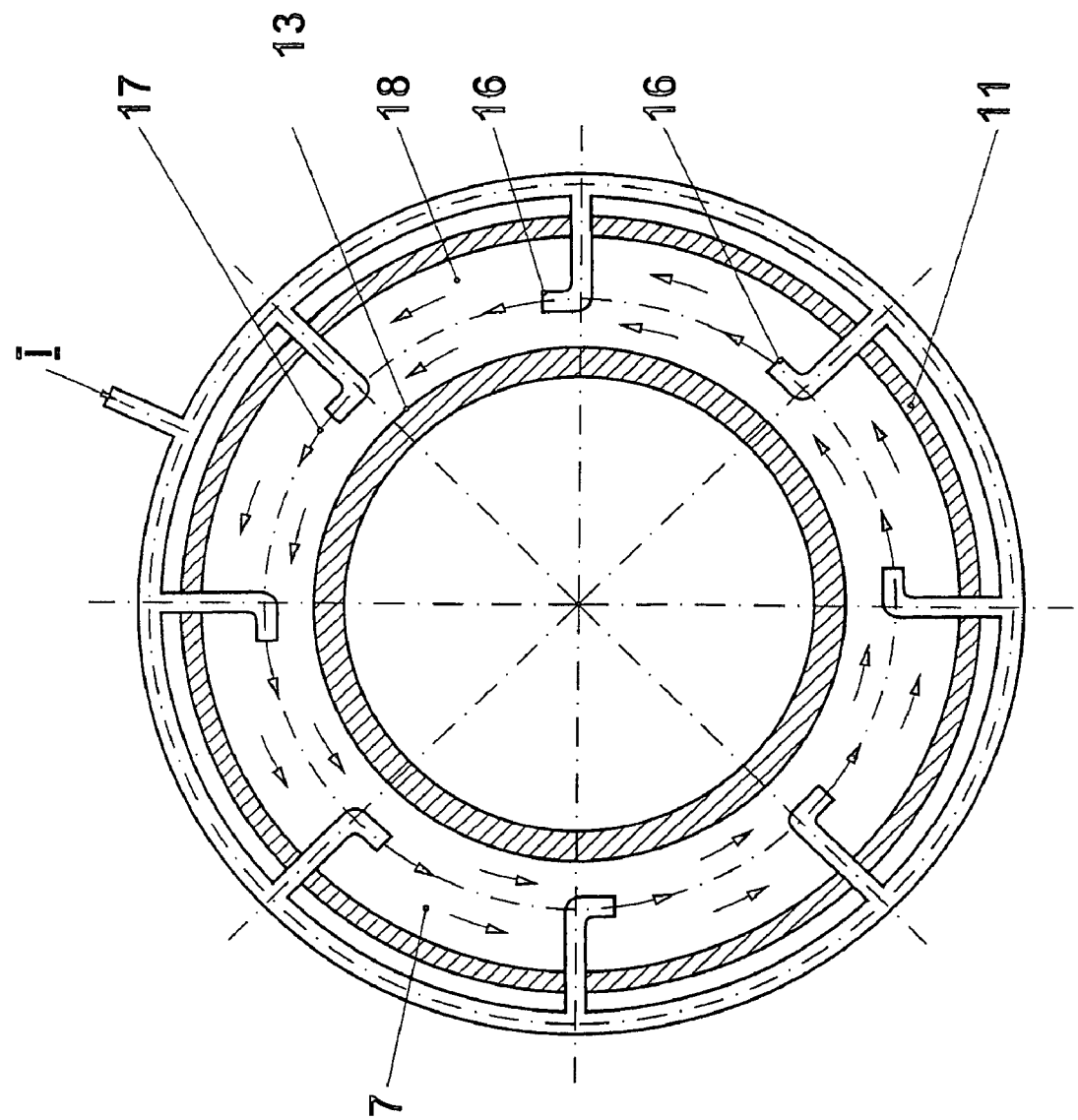
FIG. 4 shows a further section view of the gas turbine shown in FIG. 1.

FIG. 4 shows an advantageous embodiment in which the circulation flow 18 is generated by a plurality of ejectors 16 which are fed with the propelling medium 17 via a central supply line I. For this purpose, the propelling fluid flows via the central supply line into a propelling fluid plenum (without a reference symbol). The propelling fluid plenum brings about local equalization and homogeneous distribution of the propelling fluid. The ejectors branch off from the propelling fluid plenum and issue into the cavity.

Figure 5:
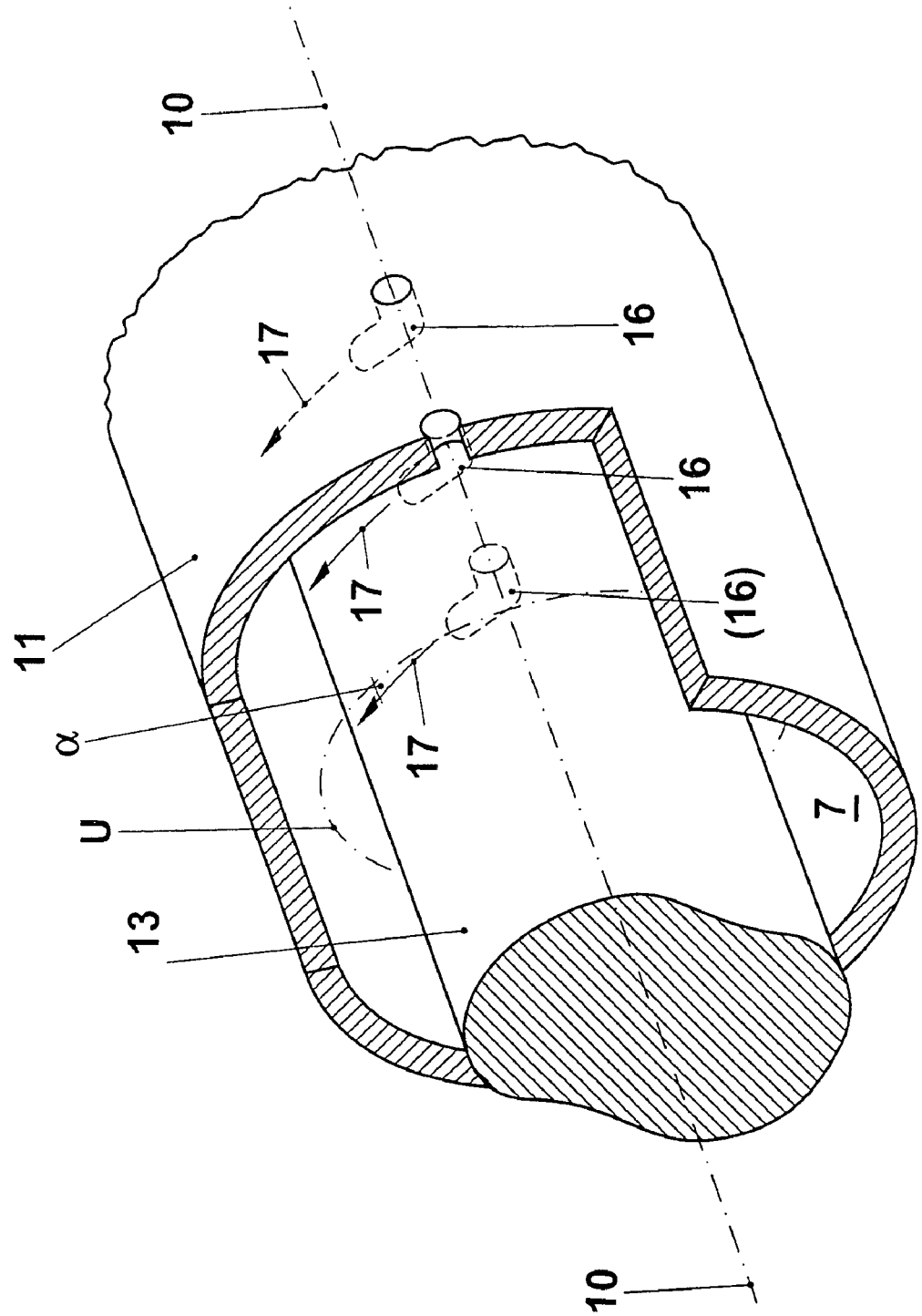
FIG. 5 shows a further preferred variant of the invention.

FIG. 5 represents a perspective illustration of an annular cavity. The inner boundary 13 is illustrated merely diagrammatically as a solid cylinder. The cavity 7 is formed between this inner boundary and an outer jacket 11. Distributed in the axial direction, are three ejectors 16 which are led through the outer jacket 11 and which cannot be seen per se in the illustration and are indicated diagrammatically by dashed lines. The ejectors are arranged such that the orientation of the blow-out direction of the propelling medium in the axial direction is inclined at an angle $\alpha$ relative to a circumferential direction indicated by a dashed and dotted line U. In the example shown, the circumferential direction U relates to the circumferential direction of the cavity 7. In order, in particular, to activate the circumferential flow, which is the primary aim, this angle of incidence $\alpha$ may be restricted to values of below 30°, in particular to values of less than 10°. Consequently, a helical throughflow, not illustrated, of the cavity is established, which, furthermore, assists in avoiding an axial temperature gradient which may possibly be established.

It is, of course, also possible, within the scope of the invention, to use other suitable means for driving the flow; for example, pressure waves may be used in a way known per se for driving the flow in the cavities themselves or else, instead of a blower, for driving the propellant flow of an ejector.

A person skilled in the art readily recognizes that the use of the invention is in no way restricted to gas turbines, so that the invention can be employed in a multiplicity of further applications. Of course, the use of the invention is also not restricted to a gas turbine with sequential combustion, illustrated in FIG. 1, but may also be employed in gas turbines with only one or with more than two combustion chambers. In particular, the invention may also be implemented in steam turbines.

List of reference symbols

- 1 Compressor
- 2 Plenum
- 3 Combustion chamber
- 4 First turbine
- 5 Combustion chamber
- 6 Second turbine
- 7 Cavity
- 9 Shaft
- 10 Engine axis
- 11 Outer casing, outer jacket, outer wall
- 12 Inner casing, inner wall, combustion space wall
- 13 Inner casing, inner wall, combustion space wall
- 14 Blower
- 16 Ejector
- 17 Propelling fluid flow
- 18 Activated flow
- U Circumferential direction
- I Supply line
- $\alpha$ Angle of incidence of the propelling medium flow with respect to the circumferential direction

The invention claimed is:

1. A method of operating a turbo engine with at least one cavity, in the form of a portion of a torus positioned between an inner casing and an outer casing, said method comprising:
    operating the turbo engine in power operation;
    continuously activating a flow in the cavity with at least one velocity component in a circumferential direction of the turbo engine or of the torus during the operation of the turbo engine; and
    shutting down the turbo engine and intermittently activating the flow during a cooling phase.

2. The method as claimed in claim 1, wherein the flow is activated by fluid emerging from at least one ejector with a circumferential velocity component.

3. The method as claimed in claim 2, wherein ambient air is delivered as the fluid by a conveying means.

4. The method as claimed in claim 2, wherein the fluid is extracted from the compressor of a gas turbo group.

5. The method as claimed in claim 2, wherein the fluid is extracted from a cooling air system of a gas turbo group.

6. The method as claimed in claim 1, further comprising the step of supplying a cooling fluid from outside.

7. A method of operating a turbo engine with at least one cavity in the form of a portion of a torus positioned between an inner casing and an outer casing wherein the cavity has an essentially annular cross section, said method comprising:
    activating a flow in the cavity with at least one velocity component in a circumferential direction of the turbo engine or the torus during operation of the turbo engine,
    wherein the flow is activated by fluid blown out of at least one ejector in a direction at an angle of less than 30° with respect to the circumferential direction, and wherein the flow includes a circumferential flow or a helical flow.

8. The method as claimed in claim 7, further comprising the step of supplying a cooling fluid from outside.

9. The method as claimed in claim 7, wherein the fluid includes ambient air delivered by a conveying means.

10. The method as claimed in claim 7, wherein the fluid is extracted from the compressor of a gas turbo group.

11. The method as claimed in claim 7, wherein the fluid is extracted from a cooling air system of a gas turbo group.

12. The method as claimed in claim 7, wherein the angle is less than 10°.

* * * * *